United States Patent
Hardinger et al.

(10) Patent No.: US 8,225,281 B1
(45) Date of Patent: Jul. 17, 2012

(54) AUTOMATED BASELINE DEPLOYMENT SYSTEM

(75) Inventors: Kerry A. Hardinger, Overland Park, KS (US); James H. Heimbach, Flower Mound, TX (US); Randall L. Stone, Greenwood, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 814 days.

(21) Appl. No.: 12/365,318

(22) Filed: Feb. 4, 2009

(51) Int. Cl.
*G06F 9/44* (2006.01)

(52) U.S. Cl. .................. 717/120; 717/174; 717/175

(58) Field of Classification Search .............. 717/120, 717/170
See application file for complete search history.

(56) References Cited

U.S. PATENT DOCUMENTS

| | | | |
|---|---|---|---|
| 5,930,333 A | 7/1999 | Jabbarnezhad | |
| 6,907,546 B1 | 6/2005 | Haswell et al. | |
| 7,010,593 B2 | 3/2006 | Raymond | |
| 7,203,938 B2* | 4/2007 | Ambrose et al. | 717/170 |
| 7,213,065 B2* | 5/2007 | Watt | 709/223 |
| 7,246,351 B2* | 7/2007 | Bloch et al. | 717/175 |
| 7,657,887 B2* | 2/2010 | Kothandaraman et al. | 717/176 |
| 7,735,062 B2* | 6/2010 | de Seabra e Melo et al. | 717/120 |
| 7,809,763 B2* | 10/2010 | Nori et al. | 707/802 |
| 7,895,591 B2* | 2/2011 | Spears | 717/168 |
| 7,996,814 B1* | 8/2011 | Qureshi et al. | 717/120 |
| 2004/0143811 A1 | 7/2004 | Kaelicke et al. | |

OTHER PUBLICATIONS

Burdick, Shirley H., et al., Patent Application entitled, "Baseline Migration in Change Management," filed Apr. 5, 2006, U.S. Appl. No. 11/398,131.
Office Action dated Feb. 3, 2010, U.S. Appl. No. 11/398,131, filed Apr. 5, 2006.
Final Office Action dated Jul. 20, 2010, U.S. Appl. No. 11/398,131, filed Apr. 5, 2006.
Advisory Action dated Oct. 13, 2010, U.S. Appl. No. 11/398,131, filed Apr. 5, 2006.
Office Action dated Feb. 2, 2011, U.S. Appl. No. 11/398,131, filed Apr. 5, 2006.
Final Office Action dated Jul. 18, 2011, U.S. Appl. No. 11/398,131, filed Apr. 5, 2006.
Business Glossary, www.allbusiness.com/glossaries/ticket/4944513-1.html, AllBusiness.com, Inc., 2010.
Crnkovic, Ivica, "A Change Process Model in an SCM Tool", Proceedings of the 24th Euromicro Conference, pp. 794-799, 1998.
Crnkovic, Ivica, et al., "Processing Requirements by Software Configuration Management", Proceedings of the 25th Euromicro Conference, 1999.
Dahlqvist, Annita P., "Product Data Management and Software Configuration Management Integration", Mälardalen University Press Licentiate Theses No. 58, pp. i, 135-141, 2005.

(Continued)

*Primary Examiner* — Sathyanarayan Pannala
*Assistant Examiner* — Mohammad Kabir

(57) ABSTRACT

An automated baseline deployment system is provided. The system comprises an at least one computer system and an automated baseline deployment application that, when executed on the computer system, extracts software source code from a source code repository in response to an application build request. The system also inserts the source code using an automated process into a secure build process to produce baseline code, places the baseline code into an application product depot, and extracts a copy of the baseline code from the application product depot in response to a deployment request. The system also creates metadata to associate a destination deployment environment with the copy of the baseline code deployed into the deployment environment and installs the copy of the baseline code into the deployment environment, wherein the application prevents the insertion of source software code from sources outside the source code repository into the secure build process.

18 Claims, 4 Drawing Sheets

OTHER PUBLICATIONS

Estublier, Jacky, et al., "Impact of the Research Community on the Field of Software Configuration Management: Summary of an Impact Project Report", Software Engineering Notes, vol. 27, No. 5, pp. 31-39, Sep. 2002.

Glossary, www.cisco.com/web/partners/program/certifications/download/glossary.pdf, 2007, Cisco Systems, Inc.

Hardinger, Kerry, "Process-Oriented Inside Process-Oriented: Fitting Process-Oriented Software Configuration Management into Process-Oriented Software Development", Telelogic 2004 User Group Conference—Americas & Asia/Pacific—Innovation Realized, pp. 1-15, Oct. 25, 2004.

Lindsay, Peter, et al., "A Framework for Subsystem-based Configuration Management", Proceedings of the 13th Australian Conference on Software Engineering, pp. 275-284, 2001.

Micallef, Josephine, et al., "The Asgard System: Activity Based Configuration Management", Proceedings of the SCM-6 Workshop on Configuration Management, pp. 175-186, 1996.

"Rational® ClearCase®: Developing Software", Rational Software Corporation, Version 2003.06.00, Part No. 800-026156-000, Windows Edition, 2003.

"Task Based Configuration Management: A New Generation of Software Configuration Management", Continuus Software Corporation, Version 2.0, http:/web.archive.org/web/20001110161300/www/continuus.com/developers/chgset.html (Retrieved: Jul. 2, 2010), May 1997.

Tichy, Walter, "Software Configuration Management", Encyclopedia of Computer Science, 4th Edition, pp. 1601-1604, 2003.

Völzer, Hagen, et al., "A Tool for Subsystem Configuration Management", Proceedings of the International Conference on Software Maintenance, 2002.

Völzer, Hagen, et al., "SubCM: A Tool for Improved Visibility of Software Change in an Industrial Setting", IEEE Transactions, vol. 30, No. 10, pp. 675-693, Oct. 2004.

Wallace, Richard, "Untangling Configuration Management to Deliver Quality Software", http://emendo-ex-erratum.org/papers/ConfigMgt.pdf (Retrieved Jul. 2, 2010), Quantum Solutions, Apr. 7, 2000.

* cited by examiner

AUTOMATED BASELINE DEPLOYMENT SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Software applications and other software products may arrive at deployment at the end of a complex process. The many individual software components that make up an application may originate from different sources and may have been created using various methods. Components may have originally been created for different applications. Different types of testing may be performed on different portions of an application, with inconsistencies between the testing methods and standards. Isolating and identifying a component of software code that is failing, underperforming, or functioning not as intended may involve systematically removing and analyzing multiple layers of code. Reproducing and observing the problematic code behavior in a laboratory environment is often a necessary step in the problem determination process. Understanding and correcting aberrant software behavior may be facilitated when a documented development history is available that provides the methodology and rationale of the code's genesis and progression, including a history of problems encountered at earlier points in an application's history and resolution steps taken at those stages.

SUMMARY

In an embodiment, an automated baseline deployment system is provided. The system comprises at least one computer system and an automated baseline deployment application that, when executed on the computer system, extracts software source code from a source code repository in response to an application build request. The system also inserts the software source code using an automated process into a secure build process to produce software baseline code, places the software baseline code into an application product depot, and extracts a copy of the software baseline code from the application product depot in response to a deployment request. The system also creates metadata to associate a destination deployment environment with the copy of the software baseline code deployed into the destination deployment environment and installs the copy of the software baseline code into the destination deployment environment, wherein the automated baseline deployment application prevents the insertion of source software code from sources outside the source code repository into the secure build process.

In another embodiment, a method of building a baseline software application using an automated baseline deployment application is provided. The method comprises receiving a message containing an application build request, starting a secure software build session between a source code repository and a designated build server, and extracting copies of source software code elements from the source code repository. The method also comprises performing automated security procedures to assure integrity of the source software code elements moving from the source code repository and inserted into a build process on the designated build server, combining the source software code elements into the requested baseline application build package in a secure build server, and storing the requested baseline application build package into an application product depot.

In another embodiment, a method of deploying baseline application build packages into deployment environments is provided. The method comprises receiving a request to deploy at least one baseline application build package into a deployment environment, extracting a copy of the at least one baseline application build package from the application product depot, and creating metadata identifying baseline application build packages to be installed into the destination deployment environment. The method also comprises associating the metadata with destination deployment environment and deploying the at least one baseline application build package and accompanying metadata into the deployment environment. The metadata promotes identifying at least one of the destination deployment environment, the build numbers of baseline application build packages deployed, the deployment methods used, the identifications of personnel requesting and authorizing deployment, and the locations of supporting documentation. In an embodiment, the metadata links the destination deployment environment with the at least one baseline application build package deployed into the destination deployment environment.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
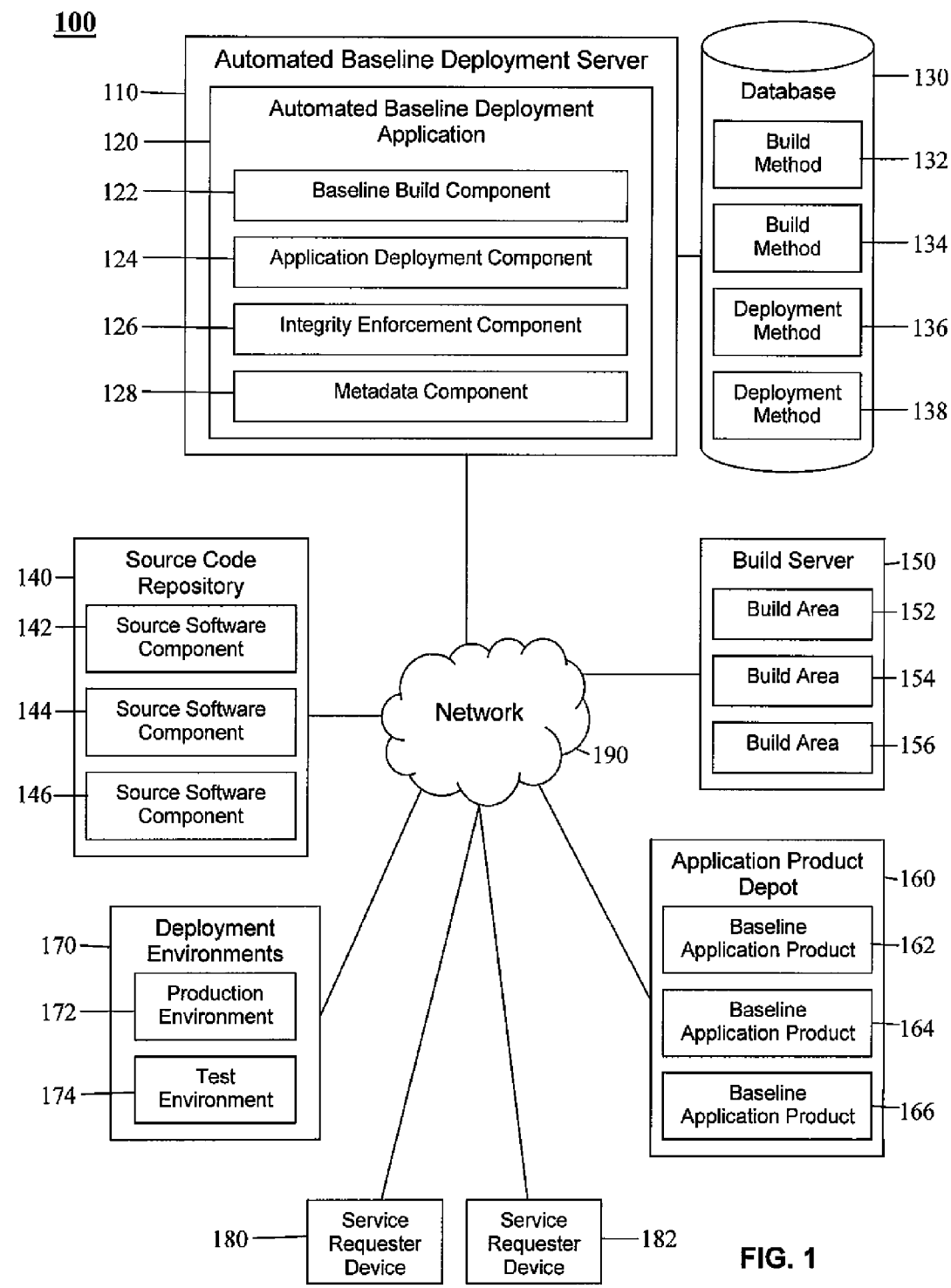
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Several embodiments of an automated baseline deployment system enable the development and deployment of a software application to be traced from its genesis as a collection of component software code elements through tightly disciplined baseline build and installation processes with the origin and identity of the individual base software components remaining traceable and identifiable. The system isolates, identifies, and traces the development and build processes of software components in applications that fail or perform below expectations in production or test environments. Software components may be further isolated and analyzed with the support of documentation that accompanies each baseline build. The traceability of base software code elements from their deployment destinations in applications in production or test environments back to their baseline build and further back to their original development source along with the control provided by the system at each step permits more rapid isolation, identification, and correction of failing or underperforming software components. Further details about capturing information about a software product and/or build are contained in U.S. patent application Ser. No. 11/398,131 filed Apr. 5, 2006, entitled "Baseline Migration in Change Management," by Shirley H. Burdick et al., which is herein incorporated by reference in its entirety.

The automated baseline deployment system may be distributed across a plurality of servers and networks in separate build and deployment environments as a suite of networked applications. The functionality of the system is spread across system components comprising source code repositories, application build servers, application product depots, and deployment environments. While separate components or subsidiary applications within the system may perform the build and deployment tasks of the system, the system also enforces the integrity of the software components and their supporting tasks, tickets, and other documentation that combine in the build process to create a product baseline. The automated baseline deployment system thereafter in the deployment process tracks product baselines by identifying their specific builds with the destination deployment server, servers, network, or broader environment in which the products from a particular baseline build are being installed. Metadata describing a destination deployment environment is linked with the specific baseline product build installed into the deployment environment. The metadata permanently associates a specific baseline product build with a specific server or group of servers in which the baseline software product is installed. The association in the metadata of the baseline product build used with the specific destination deployment servers allows problems in a deployed software application to be traced back to the baseline build wherein the individual software components in the baseline build may be examined in conjunction with the supporting tasks, tickets, and other documentation used in creating the baseline. The security of the baseline build process and the linking by the metadata of specific baseline builds to the specific deployment servers into which the baseline builds are installed provides the continuous integrity needed in enterprise software build and deployment environments.

Turning now to FIG. 1, a system 100 for automated baseline deployment is described. The system 100 comprises an automated baseline deployment server 110, an automated baseline deployment application 120, a database 130, a source code repository 140, a build server 150, an application product depot 160, a deployment environment 170, a service requester device 180, and a network 190. In an embodiment, there may exist more than one source code repository 140, build server 150, application product depot 160, deployment environment 170, and service requester device 180. In each embodiment, the additional components described have substantially the same functionality and perform substantially the same tasks and duties as the components described.

The automated baseline deployment server 110 may be any general purpose computer system, as discussed in greater detail hereinafter. The automated baseline deployment server 110 may comprise one computer or a plurality of computers, for example a server farm wherein many server computers cooperate to share a processing load. The automated baseline deployment server 110 may comprise a plurality of computers that are located at different places, for example to provide geographical diversity and increased service reliability. The automated baseline deployment server 110 executes one or more applications that provide services to at least one of the service requester devices 180 including hosting of the automated baseline deployment application 120.

The automated baseline deployment application 120 is installed on the automated baseline deployment server 110 and provides a suite of software application build and deployment services to service requester devices 180. Because the disclosure herein teaches a series of actions that may take place over a plurality of geographically dispersed components and over an extended period of time, the automated baseline deployment application 120 may be a distributed application or a distributed suite of applications directed by central functionality provided by the automated baseline deployment application 120.

The automated baseline deployment application 120 comprises a baseline build component 122 that receives an application build request from a service requester device 180. The baseline build component 122 may authenticate the application build request and may create a record in a tracking or case management system or may require that the service requester device 180 provide a record from a tracking or case management system supporting the request. In an embodiment, the baseline build component 122 may require additional support or authorization for the application build request such as supervisor or manager approval or other supporting documentation. Once the baseline build component 122 has determined that the application build request is authentic, complete, and has the necessary levels of approval, the baseline build component 122 may consult the database 130 for a build method 132 that provides specific instructions on the source software components 142 that should be selected to build the requested software package. The build method 132 may also specify routines or procedures to follow in the build process. The build method 132 may also mandate or suggest build testing and data and process integrity checking requirements during and at the completion of the build. The baseline build component 122 may contain its own internal procedures and policies to enforce in terms of each step of software selection, build method, integrity enforcement, and build testing.

After reviewing instructions contained in the build method 132 drawn from the database 130 and consulting its own internal files, the baseline build component 122 creates a build area 152 on the build server 150. The build area 152 is dedicated to the specific application build request it is fulfilling for the service requester device 180 and to the execution of instructions in the build method 132. The build method 132 may contain instructions on how the build area 152 is to be created on the build server 150. The baseline build component 122 also creates a dedicated, secure transport session between the source code repository 140 and the build area 152. The transport session is dedicated to the secure movement of source software components 142 to the build area 152. The transport session is constructed to prohibit components other than the baseline build component 122 from inserting software into the transport session and into the build area 152. After creating the build area 152 on the build server 150, creating a secure transport session, and implementing any other directives in the build method 132 regarding the creation of the overall environment in which the requested software package is to be constructed in the build area 152, the baseline build component 122 draws the necessary source software components 142 from the source code repository 140 and delivers them to the build area 152 via the secure transport session.

The source software components 142 drawn from the source code repository 140 include the specific software code elements themselves that will be combined in the build area 152 to fulfill the application build request. The source software components 142 also include documented tasks that were completed to create the software code elements. One or more tasks are completed within tickets that are the tracking mechanisms used to trace development methodology and problem resolution history for software code elements that are to be used in creating the requested software package. Tickets, the tasks included in each ticket, and any supporting documentation are essential and mandatory accompaniments to the actual software code elements extracted from the source code repository 140 and delivered to the build area 152. When the building of the requested software package is completed and the package is moved to the application product depot 160, the tasks, tickets, and supporting documentation are included and the entire package becomes the full baseline application product 162.

Once the source software components 142 and their supporting materials have been delivered to the build area 152, the baseline build component 122 follows the instructions in the build method 132 to create the baseline application product 162. The instructions describe the order in which the source software components 142 are to be combined and methods to use and routines to run during the build. Instructions may also comprise applying service packs and updates to the source software components 142 before or during the build process. The baseline build component 122 may also be required by the build method 132 or procedures built into the baseline build component 122 itself to run algorithm, checksum, or cyclic redundancy testing procedures against some or all of the source software components 142 to make certain that the source software components 142 have not been tampered with or corrupted. When the building of the requested software package in the build area 152 has been completed, the baseline build component 122 may also be required to perform testing on the requested software package. The testing may take place in one or more secure testing environments in the build server 150 under a variety of test conditions. Data that is used in the algorithm, checksum, or cyclic redundancy testing procedures performed on source software components 142, completed software packages, and other software components involved as well as results and output from these procedures may be stored with the related tickets and tasks associated with the finished and deployed software package.

When the requested software package has been fully built, tested, and determined ready for deployment, it is moved by the baseline build component 122 to the application product depot 160 where it becomes the baseline application product 162. The baseline application product 162 includes not just the requested software package but also the tickets, tasks, and documentation that accompanied the original source code elements as they were drawn from the source code repository 140. The baseline application product 162 also comprises additional tickets, tasks, and documentation generated during the build process in the build area 152 while the baseline build component 122 was following the instructions in the build method 132. In an embodiment, these supporting components may be important elements of the baseline application product 162 and should not be dissociated from the baseline application product 162. Although these supporting components may not physically accompany the baseline application product 162 in the application product depot 160, the baseline application product 162 may be accompanied by pointers to server locations where these supporting components are permanently stored. In an embodiment, some of the value of the automated baseline deployment system 100 arises from the accountability and traceability of all the development methodology underlying each of the source software components 142 that comprise a baseline application product 162. The inclusion of all of tasks, tickets, documentation, and any other materials used in support of creating a baseline application product 162 promotes accountability and traceability.

When the completed baseline application product 162 and its supporting media are placed into the application product depot 160, the baseline application product 162 may be assigned a specific build number. In an embodiment, one build number may be assigned to a single unit of baseline application product 162 if it is deemed that precise traceability is needed. In another embodiment, one build number may be assigned to two or more identical units of a baseline application product 162. How build numbers are assigned to units of a baseline application product 162 may depend on the nature and criticality of the baseline application product 162 and the types of deployment environments 170 in which the baseline application product 162 may eventually be deployed.

The automated baseline deployment application 120 also comprises the application deployment component 124 that extracts a copy of at least one baseline application product 162 from the application product depot 160 and deploys it into a deployment environment 170. The application deployment component 124 takes these steps in response to a deployment request received from a service requester device 180. Similar to the authentication process carried out by the baseline build component 122 when an application build request is received, the application deployment component 124 may authenticate the deployment request including verifying that the service requester device 180 is authorized to submit the deployment request and checking for required levels of approval. The application deployment component 124 examines the deployment request for the at least one baseline application product 162 being requested by the service requester device 180 to be deployed. The application deployment component 124 also examines the deployment environment 170 into which the service requester device 180 is requesting the baseline application product 162 be deployed. The application deployment component 124 may consult the database 130 for a deployment method 136 for instructions the application deployment component 124 may follow or is required to follow in deploying the baseline application product 162 into the specific deployment environment 170.

When the application deployment component 124 deploys the at least one baseline application product 162 into the requested deployment environment 170, the system 100 creates metadata that contains information about the deployment. The metadata contains the build numbers that identify the specific units of baseline application product 162 being deployed. The metadata also identifies the server, servers, or other environment identifying information comprising the deployment environment 170 into which the baseline application product 162 is being deployed. The metadata may also contain information about the specific deployment method 136 that was used in the deployment. The metadata is the link of accountability and traceability between the final product as it is deployed in its ultimate form and the baseline application product 162 that was extracted from the application product depot 160 for the deployment. If a problem occurs with a baseline application product 162 after it has been deployed into a final production or test deployment environment 170, the metadata created for the deployment may be consulted. The metadata will allow the at least one baseline application product 162 to be identified. From there the build numbers of the baseline application product 162 may be used to identify and examine the build processes used to construct the baseline application product 162. If necessary, the chain of events and components may be traced further back with the individual source software components 142 and their supporting tasks, tickets, and documentation used in the baseline build process identified and investigated. The metadata is a critical linkage between baseline application products 162 installed and running in test and production deployment environments 170 and the specific units of baseline application products 162 used in those deployments.

The automated baseline deployment application 120 also comprises an integrity enforcement component 126. Integrity in the system 100 comprises controlling access to each component in the system 100 to prohibit the insertion of non-approved software code at any stage of the process. This includes enforcing physical and electronic security and locking down access to the source code repository 140, build server 150, application product depot 160, and deployment environments 170 through the use of physical security procedures and software access permissions. Integrity in the system 100 also comprises enforcing security procedures during the movement of software components between the components of the system 100, for example between the source code repository 140 and the build server 150 when an application build request is being fulfilled, and between the application product depot 160 and deployment environments 170 when a deployment request is in process. In addition to guarding against the introduction of non-approved software code, integrity in the system 100 also comprises prohibiting the use of non-approved procedures while baseline application products 162 are being built and deployed. The system 100 may, for example, prevent an undisciplined technologist from circumventing the regular processes of the system 100 by introducing non-approved software or taking non-approved action at the various steps of the system 100. The system 100 requires that software components moving from the source code repository 140 through the build server 150 to the application product depot 160 and finally to deployment environments 170 are accompanied by tasks, tickets, supporting documentation, and other information appropriate to track the origin and changes to the software components. The discipline enforced by the system 100 promotes the traceability of software components back through the system 100 to their origin should a baseline application product 162 fail after being deployed.

The role of the integrity enforcement component 126 is to keep non-approved components and processes out of the system 100. Parties seeking to build applications for deployment are forced to use the interfaces of the automated baseline deployment application 120, and hackers and irresponsible users are blocked from improperly entering into the steps of the system 100. The integrity enforcement component 126 may run the previously mentioned algorithm, checksum, or cyclic redundancy testing procedures against software components at any point in the system 100. The integrity enforcement component 126 may also provide security for the source code repository 140, the build server 150, the application product depot 160, and the deployment environment 170 as well as any channels between the components of the system 100. The security provided may comprise preventing unauthorized parties from interfering with a software build or inserting software into a build or deployment process that is not approved or did not come from the source code repository 140.

The automated baseline deployment application 120 also comprises a metadata component 128 that takes instructions from the application deployment component 124 when one or more baseline application products 162 are being deployed into a deployment environment 170. The metadata component 128 creates metadata files that describe the deployment environment 170 including the identity of the target server, servers, desktop computers, domains, or any other destination components or environments involved. The metadata files created by the metadata component 128 also provide the specific build numbers or other identifying information for the at least one baseline application product 162 being deployed into the deployment environment 170. The metadata provides the critical link between the deployment environment 170 and the baseline application product 162 and promotes the traceability of software components from the deployment environment 170 to the baseline application product 162 and further back to the source code repository 140 if necessary.

The database 130 is associated with the automated baseline deployment server 110 and stores records associated with the system 100. The database 130 comprises build methods 132, 134 that are drawn upon by the baseline build component 122 when it receives an application build request from a service requester device 180. The build methods 132, 134 provide instructions for the baseline build component 122 to follow when selecting source software components 142, creating a dedicated build area 152, and implementing build methods 132, 134 in the build area 152. The database 130 also comprises deployment methods 136, 138 that are executed by the application deployment component 124 when it receives a deployment request from a service requester device 180. The deployment methods 136, 138 provide instruction to the application deployment component 124 to follow when choosing the at least one baseline application product 162 from the application product depot 160 to deploy into the deployment environment 170. The deployment methods 136, 138 may also provide requirements for the application deployment component 124 regarding installation and testing methods during the deployment. The deployment methods 136, 138 may finally provide instructions to the application deployment component 124 and the metadata component 128 to follow in creating and storing metadata that establish the link between the deployment environments 170 and the specific build number(s) of the baseline application products 162 installed therein.

The source code repository 140 is a secure server or servers that store the source software components 142, 144, 146 used by the baseline build component 122 to fulfill application build requests received by the baseline build component 122 from service requester devices 180. The source code repository 140 also stores tasks, tickets, and documentation that remain a continuing part of source software components 142. The source code repository 140 may alternately store pointers to those components wherein those components reside on a server or in a database. When a source software component 142 is drawn from the source code repository 140 by the baseline build component 122 to be included in the process of building a baseline application product 162, the tasks, tickets, and documentation or pointers thereto associated with the source software component 142 are included in the build process along with the source software component 142.

The build server 150 is a server or servers used for the building of baseline application products 162 by the baseline build component 122 at the request of service requester devices 180. The build server 150 comprises build areas 152, 154, 156 that are established by the baseline build component 122. The build areas 152, 154, 156 are secure areas segregated from contact with any components other than the baseline build component 122. A build area 152, 154, 156 may be a virtual server established on the build server 150 or it may be a segregated, secure work area on the build server 150. The baseline build component 122 combines the source software components 142 drawn from the source code repository 140 specified by the build method 132 in the build area 152. These actions are taken in the manner directed by the build method 132. The baseline build component 122 also conducts testing required by the build method 132 before, during, and at the conclusion of the build process. All of these steps take place in the build area 152 and the requested software product does not leave the build area 152 until it is deemed acceptable for deployment as a baseline application product 162.

The application product depot 160 is the location wherein the deployment-ready baseline application products 162, 164, 166 are stored by the automated baseline deployment application 120 when the baseline build component 122 has completed all steps of building the baseline application products 162, 164, 166 in the build area 152, 154, 156 on the build server 150 in accordance with instructions in the build method 132 and at the request of the service requester device 180. The application product depot 160 may be a secure server or servers or may simply be a folder on a server. When the application product depot 160 is a folder, it is a segregated area of space on one or more servers that may be protected by permissions permitting access only to authorized parties. Permissions to folders storing baseline application products 162, 164, 166 are enforced by the automated baseline deployment application 120, operating system software, and/or other software. Baseline application products 162, 164, 166 are accessible only by the application deployment component 124 and the metadata component 128 when the automated baseline deployment application 120 receives a deployment request from a service requester device 180.

The deployment environments 170 comprise the production environments 172 and test environments 174 wherein baseline application products 162 are deployed by the application deployment component 124 when a deployment request is received from a service requester device 180. A deployment environment 170 may comprise a single server, a group of servers, a domain, or an entire enterprise. A deployment environment 170 may alternatively comprise one or more desktop, laptop, or handheld computers. A deployment environment 170 may finally comprise one or more printers, routers, switches, or any other devices used in an information technology environment. Production environments 172 comprise deployment environments 170 wherein baseline application products 162, 164, 166 are deployed for final use in production. Test environments 174 comprise deployment environments 170 wherein baseline application products 162, 164, 166 are deployed for use in further testing of the baseline application products 162, 164, 166 themselves or for testing of the baseline application products 162, 164, 166 in conjunction with other software components and methods not part of the system 100.

In an embodiment, the automated baseline deployment server 110, the database 130, the source code repository 140, the build server 150, the application product depot 160, and the deployment environments 170 may reside together on a single physical computer, on separate physical computers, or a combination thereof. As the automated baseline deployment system 100 comprises two basic processes, a build process and a deployment process, and in practice may comprise a plurality of software components in a broadly distributed environment, the functionality of the automated baseline deployment application 120, the database 130, the source code repository 140, the build server 150, the application product depot 160, and the deployment environments 170 may not reside on discrete physical computer devices. In an embodiment, these individual components may share software components and processes as well as physical hardware components.

The service requester devices 180, 182 are the components that generate and submit application build requests as well as deployment requests to the automated baseline deployment application 120. In an embodiment, a vice president of information technology of a global organization may order the creation and deployment of a major server refresh to be distributed worldwide. In another embodiment, a single user may require a specific hard drive build when receiving a new laptop. In both embodiments, the request for these services is received by the automated baseline deployment application 120 from a service requester device 180, 182. In some embodiments the service requester device 180, 182 may be the ultimate deployment environment 170 for the baseline application product 162 and in other embodiments the service requester device 180, 182 may request that the baseline application product 162 be deployed in a different deployment environment 170.

The network 190 promotes communication between the components of the system 100. The network 190 may be any communication network including a public data network (PDN), a public switched telephone network (PSTN), a private network, and/or a combination thereof.

Figure 2:
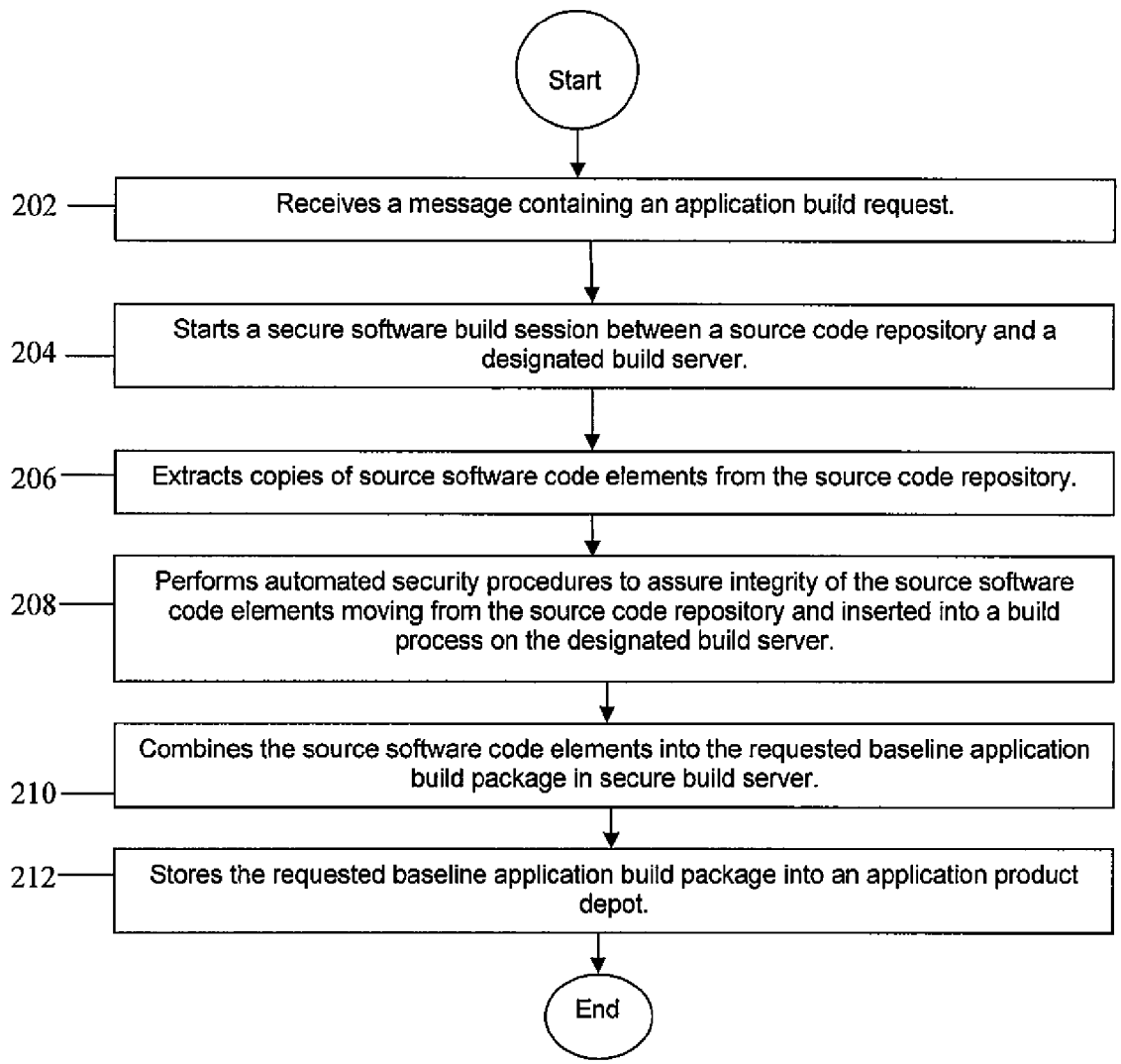
FIG. 2 is a flow chart illustrating a method according to an embodiment of the disclosure.

Turning now to FIG. 2, a method 200 for building a baseline application product 162 is provided. At block 202, the automated baseline deployment application 120 receives an application build request from the service requester device 180. The automated baseline deployment application 120 causes the baseline build component 122 to authenticate the message, extract a copy of a build method 132 from the database 130, and create a build area 152 on the build server 150.

At block 204, the baseline build component 122 starts a secure session between the source code repository 140 and the build server 150. At block 206, the baseline build component 122 draws source software components 142 from the source code repository 140. In addition to the basic software code that will be used to build the requested application, the source software components 142 include tasks, tickets, and documentation supporting the source software components 142 or pointers thereto. The baseline build component 122 may check for conflicts between source software components 142 before inserting them into the build processes.

At block 208, the baseline build component 122 and the integrity enforcement component 126 perform automated security procedures on the source software components 142 and on other components involved in the build process. These procedures may include algorithm, checksum, or cyclic redundancy testing procedures as well as antivirus checking procedures on the components. The procedures may also include security checking procedures on transport channels between the source code repository 140 and the build server 150 and security procedures performed on the build area 152 to bar interference from non-approved parties including insertion of non-approved software components.

At block 210, the baseline build component 122 performs the build process in the build area 152 in accordance with instructions included in the build method 132. The instructions specify how each of the individual source software components 142 are to be inserted into the build process and procedures and routines to be completed during the build process. Instructions also specify testing to be conducted during and at the end of the build process. Instructions finally may also specify how the baseline build component 122 packages the final product into the deployment-ready baseline application product 162 immediately prior to placement into the application product depot 160. If for some reason the build process fails, the baseline build component 122 may terminate the session and notify the service requester device 180.

At block 212, the baseline build component 122 places the finished, tested and deployment-ready baseline application product 162 into the application product depot 160. The baseline build component 122 may provide a build number to the baseline application product 162 as it is placed into the application product depot 160. The baseline build component 122 may also dismantle the build area 152 as the build process is completed. The baseline build component 122 may finally send a message to the service requester device 180 indicating that its request has been completed and that the baseline application product 162 is in the application product depot 160 and available for deployment.

Figure 3:
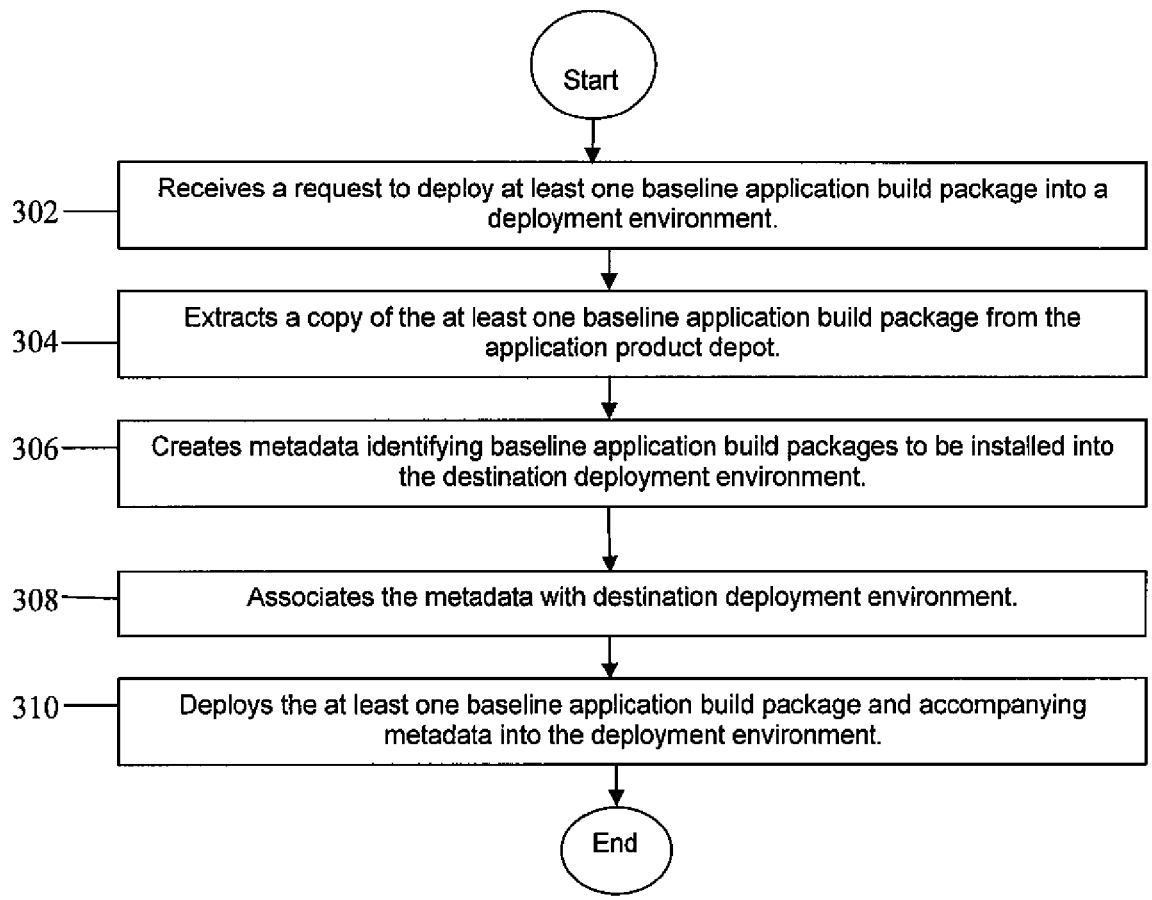
FIG. 3 is a flow chart illustrating another method according to an embodiment of the disclosure.

Turning now to FIG. 3, a method 300 for deploying one or more baseline application products 162 into a deployment environment 170 is provided. At block 302, the automated baseline deployment application 120 receives a deployment request from a service requester device 180. The application deployment component 124 is activated. The deployment request is reviewed and authenticated by the application deployment component 124. A copy of a deployment method 136 is extracted from the database 130, the deployment method 136 specific to the type of baseline application product 162 and the destination deployment environment 170 involved. The deployment method 136 may also contain instructions directed to the metadata component 128 regarding its creation of metadata specific to this deployment.

At block 304, the application deployment component 124 extracts a copy of at least one baseline application product 162 from the application product depot 160. At block 306, the metadata component 128 creates metadata identifying the build number of the baseline application product 162 and linking the build number with the deployment environment 170 designated in the request received from the service requester device 180 and confirmed by the deployment method 136.

At block 308, the application deployment component 124 associates the metadata created at block 306 with the destination deployment environment 170. The metadata may be duplicated and stored in more than one location for fault tolerance purposes so that the link between the destination deployment environment 170 and the baseline application product 162 deployed therein—and by connection the traceable link further back into the process to the source software components 142 used to create the baseline application product 162—is permanently preserved and accessible.

At block 310, the application deployment component 124 deploys the at least one baseline application product 162 into the deployment environment 170 in accordance with the deployment request received from the service requester device 180 and pursuant to directions contained in the deployment method 136. In an embodiment, the deployment may comprise a distribution server pushing a suite of applications or a full client desktop build over an enterprise network to thousands of desktop units or pushing a highly critical security patch to production database servers. In another embodiment, a deployment may alternately be invoked by a single user running a script from a floppy diskette that updates an application on the user's machine from a nearby general purpose server.

When the process of deployment is complete, the automated baseline deployment application 120 may send a message to the service requester device 180 confirming that the baseline application product 162 requested has been successfully deployed in the deployment environment 170 specified by the service requester device 180. The application deployment component 124 may also dismantle the deployment session and take steps to make certain that the metadata created for the present deployment contains all necessary information concerning the deployment and that the multiple copies of the metadata have been properly placed.

The method 200 and the method 300 are provided to teach the processes of build and deployment, respectively, of a baseline application product 162, in the system 100. In an embodiment, a service requester device 180 may enter a single request that causes each process to run automatically and in succession without any further intervention such that a software build is created and deployed almost as one single action. The end result of the methods 200 and 300 in the system 100 is to deploy a securely and methodically constructed baseline application product 162 into a deployment environment 170 that in the event of a failure may be traced back to its constituent build number and further back to its source software components 142 and all supporting materials and documentation. The integrity and discipline enforced on the components and processes at the steps of the methods 200 and 300 may permit effective problem identification, analysis, and ultimate resolution.

Figure 4:
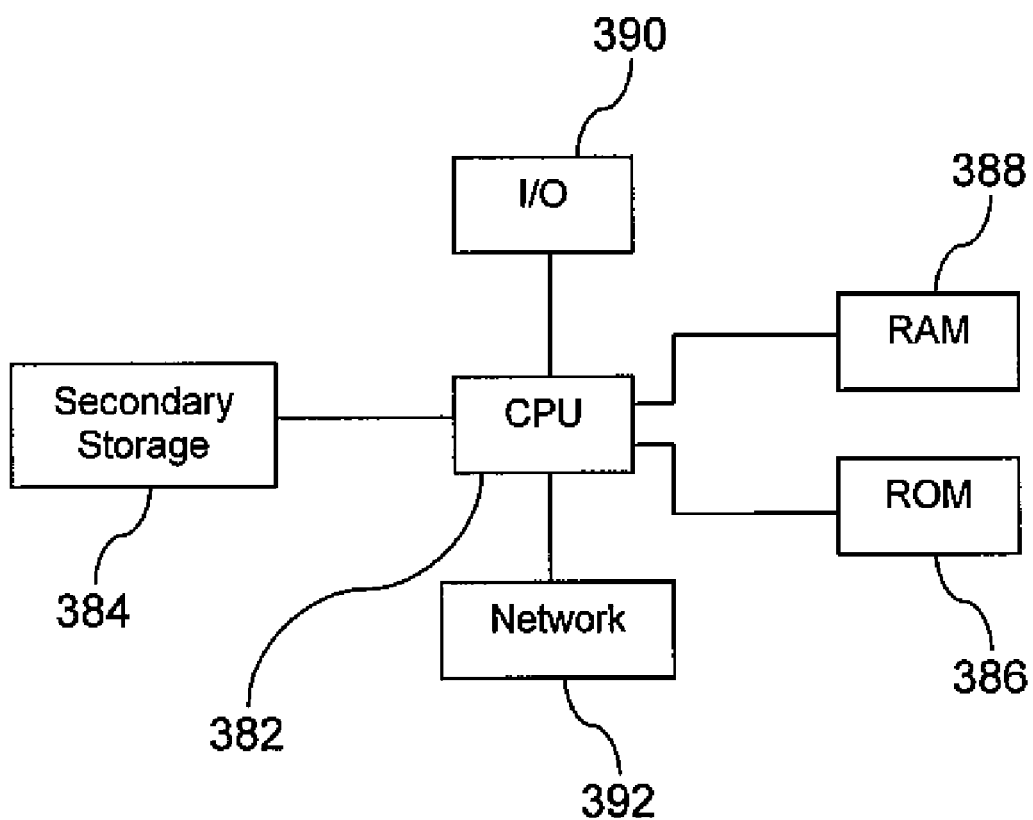
FIG. 4 illustrates an exemplary general purpose computer system suitable for implementing the several embodiments of the disclosure.

Some aspects of the system described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An automated baseline deployment system, comprising:
    an at least one computer system;
    a processor; and
    an automated baseline deployment application comprising instructions stored on the computer system that, when executed by the processor receives an application build request from a service requester to build software baseline code;
        extracts software source code from a source code repository in response to the application build request;
        inserts the software source code using an automated process into a secure build process to produce the software baseline code;
        places the software baseline code into an application product depot for deployment to one or more destination deployment environments;
        receives a deployment request from the service requester;
        extracts a copy of the software baseline code from the application product depot in response to the deployment request;
        receives instructions for deploying the software baseline code to one of the one or more destination deployment environments based on the deployment request;
        creates and stores metadata, at the time of or prior to deployment to the one of the one or more destination deployment environments, to associate the one of the one or more destination deployment environments with the copy of the software baseline code deployed into the one of the one or more destination deployment environments, wherein the metadata associated with the one of the one or more deployment environments identifies at least one specific item of the software baseline code deployed into the one of the one or more deployment environments by a build number, and wherein the build number promotes tracing and identifying individual components of source software code used in the build process back to the source code repository; and
        installs the copy of the software baseline code and deploys associated metadata into the one of the one or more destination deployment environments, wherein the automated baseline deployment application prevents the insertion of source software code from sources outside the source code repository into the secure build process.

2. The system of claim 1, wherein the automated baseline deployment application comprises a suite of applications executing in a distributed build and deployment environment over a plurality of computers.

3. The system of claim 1, wherein the automated baseline deployment application applies security procedures to assure the integrity of the build and deployment processes.

4. The system of claim 1, wherein software baseline code stored in the application product depot is accompanied by supporting tickets, tasks, and documentation.

5. The system of claim 1, wherein the automated baseline deployment application prevents the storage of software media in the application product depot other than software baseline code built in the secure build process.

6. A method of building a baseline software application using an automated baseline deployment application and deploying baseline software applications into deployment environments, comprising:

receiving a message containing an application build request from a service requester to build a baseline software application;

starting a secure software build session between a source code repository and a designated build server;

extracting copies of source software code elements from the source code repository;

performing automated security procedures to assure integrity of the source software code elements moving from the source code repository for insertion into a build process on the designated build server;

combining the source software code elements into the requested baseline software application in a secure build server;

storing the requested baseline software application into an application product depot for deployment to one or more destination deployment environments;

receiving a deployment request from the service requester;

extracting a copy of the baseline software application from the application product depot in response to the deployment request;

receiving instructions for deploying the baseline software application to one of the one or more destination deployment environments based on the deployment request;

creating and storing metadata, at the time of or prior to deployment to the one of the one or more destination deployment environments, to associate the one of the one or more destination deployment environments with the copy of the software baseline application deployed into the one of the one or more destination deployment environments, wherein the metadata associated with the one of the one or more deployment environments identifies at least one specific item of the baseline software application deployed into the one of the one or more deployment environments by a build number, and wherein the build number promotes tracing and identifying individual components of source software code used in the build process back to the source code repository; and installing the copy of the baseline software application and deploying associated metadata into the one of the one or more destination deployment environments, wherein the automated baseline deployment application prevents the insertion of source software code from sources outside the source code repository into the build process.

7. The method of claim 6, wherein service pack updates and security patches are applied to the source software code elements and antivirus checking procedures are followed before the source software code elements are inserted into the build process.

8. The method of claim 6, wherein the automated security procedures comprise the application of algorithms, checksum routines, and cyclic redundancy checks.

9. The method of claim 8, wherein the software build process is terminated when errors are detected during the application of automated security procedures.

10. The method of claim 6, wherein baseline software applications completing the build process are tested prior to staging in the application product depot.

11. The method of claim 6, wherein a baseline software application staged in the application product depot includes tickets, tasks, memoranda, and supporting documentation involved in developing the source software code elements used to create the baseline applications.

12. The method of claim 6, wherein the build process checks for conflicts among the source software code elements before inserting the software source code elements into the build process.

13. A method of building a baseline application build package using an automated baseline deployment application and deploying baseline application build packages into deployment environments, comprising:

receiving an application build request from a service requester to build at least one baseline application build package;

extracting software source code from a source code repository in response to the application build request;

inserting the software source code using an automated process into a secure build process to produce the at least one baseline application build package;

placing the at least one baseline application build package into an application product depot for deployment to one or more destination deployment environments;

receiving a request to deploy the at least one baseline application build package into one of the one or more destination deployment environments;

extracting a copy of the at least one baseline application build package from the application product depot;

receiving instructions for deploying the at least one baseline application build package into the one of the one or more destination deployment environments;

creating and storing metadata, at the time of or prior to deployment to the one of the one or more destination deployment environments, identifying the at least one baseline application build package to be installed into the one of the one or more destination deployment environments, wherein the metadata promotes identifying at least one of the one of the one or more destination deployment environments, the build numbers of baseline application build packages deployed, the deployment methods used, the identifications of personnel requesting and authorizing deployment, and the locations of supporting documentation;

associating the metadata with the one of the one or more destination deployment environments at the time of or prior to deployment, wherein the metadata associated with the one of the one or more deployment environments identifies at least one specific item of the at least one baseline application build package deployed into the one of one or more deployment environments by a build number, and wherein the build number promotes tracing and identifying individual components of source software code used in the secure build process back to the source code repository; and deploying the at least one baseline application build package and accompanying metadata into the one of the one or more deployment environments wherein the automated baseline deployment application prevents the insertion of source software code from sources outside the source code repository into the secure build process.

14. The method of claim 13, wherein the metadata comprises at least one of files and pointers to files describing at least one of the one or more destination deployment environments, the build numbers of baseline application build packages deployed, the deployment methods used, the identifications of personnel requesting and authorizing deployment, and the locations of supporting documentation.

15. The method of claim 13, wherein the one or more destination deployment environments include at least one of test deployment environments and production deployment environments.

16. The method of claim 13, wherein the specific build of a baseline application build package is traceable and accessible after the baseline application build package has been deployed.

17. The method of claim 13, wherein the use of automated tools to install software products into deployment environments prevents tampering with the deployment process and prevents at least one of the introduction of non-approved software components and the use of non-approved deployment processes.

18. The method of claim 13, wherein a deployment environment comprises at least one of a server and a plurality of servers.

* * * * *